March 24, 1959   F. L. HARGROVE ET AL   2,879,092
FRICTION SHAFT-COUPLING ASSEMBLY
Filed Dec. 13, 1957
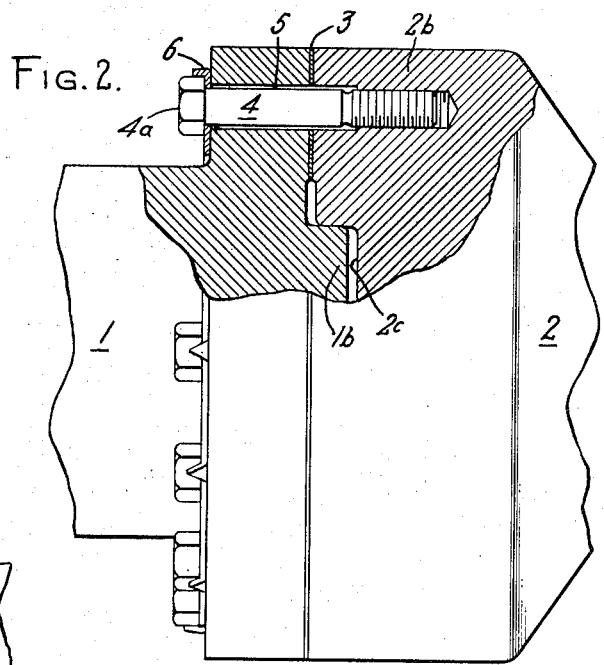
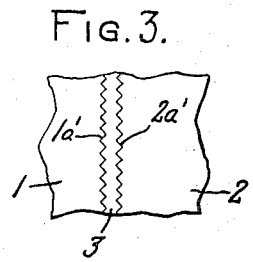
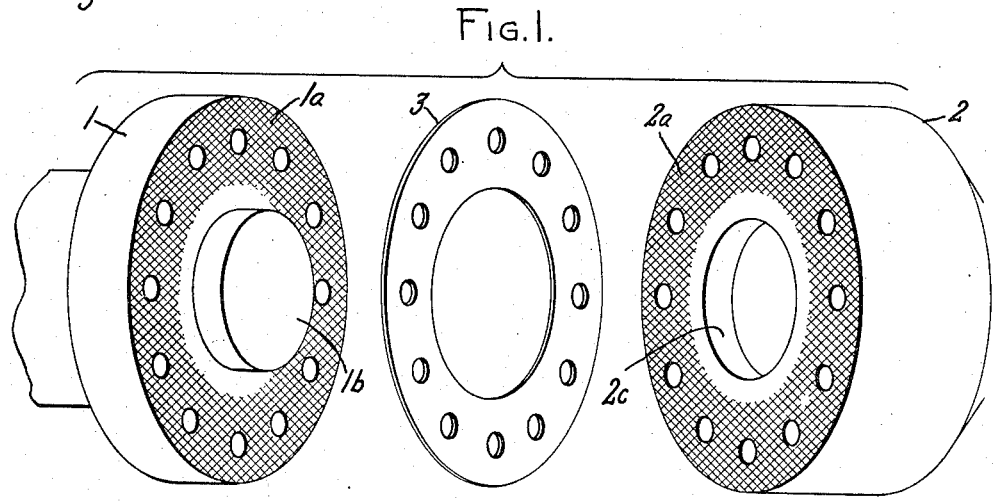
INVENTORS
FRANK L. HARGROVE
LLOYD P. GROBEL
BY
THEIR ATTORNEY

United States Patent Office 2,879,092
Patented Mar. 24, 1959

2,879,092

FRICTION SHAFT-COUPLING ASSEMBLY

Frank L. Hargrove, Scotia, and Lloyd P. Grobel, Schenectady, N.Y., assignors to General Electric Company, a corporation of New York Application December 13, 1957, Serial No. 702,560

6 Claims. (Cl. 287—129)

This invention relates to a shaft-coupling device and particularly to such a device for coupling together two rotors of an elastic-fluid turbine in which the torque is transmitted through the frictional engagement between the coupling members.

One method used to couple two turbine rotors is to "machine-finish" the adjacent coupling faces and then bolt the rotors together to provide a friction coupling through which torque is transmitted from one rotor to the other without placing the bolts under a shearing load. This method, while satisfactory, is subject to the disadvantage that this coupling design results in a relatively low coefficient of friction between the coupling faces. With a low coefficient of friction, the bolt loading in tension must be very high in order to provide a coupling having a high-torque load-carrying capacity. The increased number of bolts required results in a coupling having a larger diameter than would be necessary if a higher coefficient of friction could be obtained between the coupling faces. Also, in a coupling of this design, if the coupling faces slip and the contact surfaces are damaged, due to a sudden increase in torque loading, the renewal of the coupling surfaces may involve difficult machining problems.

Accordingly, an object of this invention is to provide a coupling in which the friction coefficient between the coupling members is increased to transmit a maximum amount of torque in a coupling of minimum diameter.

A further object is to provide a novel friction-coupling assembly in which the friction contact surfaces can be readily renewed in the event of damage to the friction surfaces caused by slippage between the mating coupling members.

Other objects and advantages will be apparent from the specification and claims and accompanying drawings which illustrate an embodiment of the invention in which Fig. 1 is an exploded view of the coupling assembly;

Fig. 2 is a view of the assembled coupling; and

Fig. 3 is an enlarged view illustrating the engagement between the shim and coupling members.

Generally stated, the invention is practiced by providing a coupling assembly consisting of two rotor end portions having adjacent roughened surfaces and a metallic shim member, held together by bolts or other equivalent fastening means. The shim is made of a softer material than the rotor members so that the roughened surfaces will dig into the shim member to increase the friction contact between the rotor members.

Referring first to Fig. 1, there is shown an exploded view of a coupling assembly including a high-pressure turbine rotor 1, a low-pressure turbine rotor 2, and a shim member 3 therebetween. The adjacent radial faces 1a, 2a of rotors 1, 2 respectively are arranged generally in a plane perpendicular to the axis of the rotors and are roughened to increase the friction coefficient between the rotor members 1, 2 and shim 3. This roughening may be done by any number of methods including "shot peening," "grit blasting," or "knurling."

In accordance with this invention, the increased friction contact between the rotor members is made possible by using a shim which is made of a metal which is softer than the rotor members 1, 2 but which is sufficiently hard so that the shim will not be "extruded" from the space between the coupling members during assembly and operation. The irregular surfaces of the coupling faces 1a, 2a indent the shim 3 so that the shim conforms to the shape of the coupling surface to form positive locks (see Fig. 3). In addition to the relative softness requirement, the shim must have sufficient shear strength so that it is capable of transmitting the torque from one rotor member to the other without failing. For example, when ferritic-steel rotors are to be coupled together, the shim can be made of copper, copper alloys such as commercial bronze, commercial brass, red brass, and numerous aluminum-iron, and magnesium alloys which possess the required shear strength and malleability. The shim could also be made of a hard material which is coated by one of the foregoing metals.

It is important to note that the shim must be of such a thickness that the "peaks" $1a'$, $2a'$ of the roughened surfaces $1a$, $2a$ do not pierce the shim when the coupling is assembled; and it must be thin enough so that the shim will not distort when placed under compression, which would bring about slight angular misalignment of the rotors when the coupling is assembled.

Fig. 2 illustrates the assembled coupling, the shaft-end portions 1, 2 being held together by coupling bolts 4. The bolts are threaded into a flange $2b$ of the rotor member 2 and an annular clearance space 5 is provided between the bolts 4 and rotor members 1, 2 so that the bolts are not loaded in shear by the torque impressed on the coupling assembly. Thus, torque is transmitted entirely by the friction force generated between the shim and rotor end portions. A locking plate 6 is provided between a bolt head $4a$ in the rotor 1 to prevent accidental loosening of the bolt 4. The rotor members 1, 2 are centered relative to each other by a fixed rabbet $1b$ formed on the rotor 1 which projects into a mating recess $2c$ defined by the rotor 2.

When the coupling is assembled as indicated in Fig. 2, the bolts 4 are tightened to produce a high axial force in the bolts. Thus the relatively softer shim member 3 is "extruded" into the cavities of the roughened surfaces, as shown in Fig. 3. The maximum torque-transmitting capacity of the coupling is of course directly proportional to the coefficient of friction. Also, the torque increases with the tension in the bolts, and to accommodate the required number of bolts a coupling having a relatively large diameter may be necessary. It is apparent that with an increased friction coefficient a lower bolt tension or fewer bolts within a smaller bolt circle can be used, for a given torque-transmitting capacity. In the event the coupling members accidentally slip circumferentially relative to each other, due to an abnormally large, sudden increase in torque sufficient to deform shim 3 by "shearing" off the "peaks," the coupling can be disassembled, and a new shim 3 inserted to renew the friction contact between the coupling surfaces.

Tests have shown that with a copper shim of a thickness on the order of .005 inch between steel end flange members, the effective coefficient of friction is approximately .45 to .65. This compares with a friction coefficient of .11 to .20 in a coupling where no insert is used between the roughened surfaces. Thus the invention appears to more than double the friction force obtainable.

Thus it will be seen that the invention provides for a friction-coupling assembly in which the coefficient of friction between the members coupled is substantially increased by employing a thin, relatively soft, yet reasonably strong metallic insert between the harder roughened surfaces of the coupling. The increased friction between the coupling faces permits the use of fewer bolts and thus a smaller diameter coupling in order to obtain a torque-carrying capacity comparable to a conventional coupling. Conversely, use of the invention will substantially increase the torque-carrying capacity of a coupling with a given bolt loading.

While a single embodiment of the invention has been described in detail herein, it will be obvious to those skilled in the art that certain changes and substitutions of equivalents may be made. For example, the coupling flange members can be held together by any suitable clamp band or equivalent fastening device in place of the bolts, and the assembly is not limited in use to connecting turbine rotors, but is of general application. Also, while a copper insert has been cited as an example, the invention encompasses shim members made of other materials discussed herein.

It is, of course, intended to cover by the appended claims all such modifications which fall within the true spirit and scope of the invention.

What we claim as new and desire to secure by Letters Patent of the United States is:

1. A shaft-coupling assembly comprising end flanged members defining adjacent parallel radially extending faces, a thin plate member disposed between said faces, and means securing said end flanged members tightly against said plate member, each of the adjacent radial faces having a roughened surface, and the plate member being constructed of a material of good shear strength but softer than the flange members, whereby the roughened surfaces permanently indent the abutting surfaces of the insert member in accordance with the initial positions of the flanged members when the securing means is tightened to increase the effective coefficient of friction between the end flanged members.

2. A coupling assembly comprising rotor end portions defining adjacent radially extending roughened surfaces and a thin, insert plate member located therebetween, means firmly securing together the rotor end portions and plate member, the plate member being made of a material having shear strength sufficient to withstand the torque carried by the coupling, and sufficiently soft to permit permanently aligning indentation by said roughened, rotor end surfaces in accordance with the initially aligned position of the rotors to increase the coefficient of friction between the rotor end portions when the securing means is tightened.

3. A coupling assembly including a pair of end flanged members with clamping means securing them together, said members defining adjacent radially extending roughened surfaces, a thin plate member having a thickness on the order of .005 inch disposed between said roughened surfaces and made of a metallic material soft enough to permit indentation thereof by the roughened surfaces when the clamping means is tightened to increase the friction contact between the coupling members, said metallic material having sufficient shear strength to transmit the torque on the coupling assembly.

4. A coupling assembly in accordance with claim 3 in which the soft plate member is made of a predominantly copper material.

5. A coupling assembly comprising coupling members defining adjacent radially extending roughened surfaces, means securing the coupling against axial displacement, the securing means and at least one of the coupling members defining a radial clearance space therebetween whereby the securing means are not loaded in shear, and means for increasing the coefficient of friction between the adjacent coupling faces to increase the torque capacity of the coupling comprising a thin insert disposed between the coupling faces which is made of a softer material than the coupling faces to permit permanently aligning indentation by the roughened surfaces and which has sufficient shear strength to transmit the torque on the coupling solely through the roughened surfaces.

6. A rotor coupling assembly comprising steel, rotor end portions defining closely adjacent radially extending roughened surfaces, means securing the end portions against axial displacement consisting of a plurality of fastening means, each of the fastening defining with at least one of the rotor end portions a radial clearance space therebetween whereby the fastening means are not subject to shear loads, and means for increasing the coefficient of friction between the coupling members including a thin copper plate on the order of .005 inch thick clamped tightly between the coupling faces, whereby the roughened surfaces of the rotor end portions permanently indent the respective opposite surfaces of the relatively softer plate when the fastening means are tightened.

References Cited in the file of this patent

UNITED STATES PATENTS

| | | |
|---|---|---|
| 1,140,855 | Shaw | May 25, 1915 |
| 1,908,592 | Flather | May 9, 1933 |
| 2,161,956 | Robertson | June 13, 1939 |
| 2,303,032 | Dusevoir | Nov. 24, 1942 |

UNITED STATES PATENT OFFICE

CERTIFICATE OF CORRECTION

Patent No. 2,879,092                                                        March 24, 1959

Frank L. Hargrove et al.

It is hereby certified that error appears in the printed specification of the above numbered patent requiring correction and that the said Letters Patent should read as corrected below.

Column 4, line 28, after "steel" strike out the comma; line 32, after "fastening", second occurrence, insert -- means --.

Signed and sealed this 28th day of July 1959.

(SEAL)
Attest:

KARL H. AXLINE
Attesting Officer

ROBERT C. WATSON
Commissioner of Patents